(12) United States Patent
Carlson

(10) Patent No.: US 9,065,120 B2
(45) Date of Patent: Jun. 23, 2015

(54) BATTERIES UTILIZING ELECTRODE COATINGS DIRECTLY ON NANOPOROUS SEPARATORS

(75) Inventor: Steven A. Carlson, Cambridge, MA (US)

(73) Assignee: Optodot Corporation, Woburn, MA (US)

( * ) Notice: Subject to any disclaimer, the term of this patent is extended or adjusted under 35 U.S.C. 154(b) by 286 days.

(21) Appl. No.: 13/302,795

(22) Filed: Nov. 22, 2011

(65) Prior Publication Data

US 2012/0115029 A1 May 10, 2012

Related U.S. Application Data

(63) Continuation-in-part of application No. PCT/US2010/001536, filed on May 26, 2010, and a continuation-in-part of application No. PCT/US2010/001537, filed on May 26, 2010, and a continuation-in-part of application No. PCT/US2010/001539, filed on May 26, 2010, and a continuation-in-part of application No. PCT/US2010/001535, filed on May 26, 2010.

(60) Provisional application No. 61/217,132, filed on May 26, 2009.

(51) Int. Cl.
*H01M 2/16* (2006.01)
*H01M 4/64* (2006.01)
*H01M 10/42* (2006.01)
*H01M 6/16* (2006.01)
*H01M 10/052* (2010.01)
*H01M 4/136* (2010.01)

(52) U.S. Cl.
CPC .......... *H01M 2/166* (2013.01); *Y10T 29/49115* (2015.01); *Y10T 29/4911* (2015.01); *H01M 4/64* (2013.01); *H01M 6/16* (2013.01); *H01M 10/052* (2013.01); *H01M 10/4235* (2013.01); *Y02T 10/7011* (2013.01); *H01M 4/136* (2013.01)

(58) Field of Classification Search
CPC ... H01M 10/4235; H01M 2/166; H01M 4/64; H01M 10/052; H01M 6/16; H01M 4/136
USPC ......................................... 429/129, 209, 247
See application file for complete search history.

(56) References Cited

U.S. PATENT DOCUMENTS 3,625,771 A  12/1971  Arrance et al.
3,647,554 A   3/1972  Arrance et al.
(Continued)

FOREIGN PATENT DOCUMENTS

CA    2605874      1/2007
EP    0143562 A1   6/1985
(Continued)

*Primary Examiner* — Muhammad Siddiquee
(74) *Attorney, Agent, or Firm* — Finch & Maloney PLLC

(57) ABSTRACT

Provided are lithium batteries utilizing electrode coatings directly on nanoporous separators, the batteries comprising (a) a separator/cathode assembly, (b) a separator/anode assembly, and (c) an electrolyte, where the batteries comprise alternating layers of the separator/cathode assembly and the separator/anode assembly. Preferably, a portion of the separator/cathode assembly is not in contact with the separator/anode assembly and a portion of the separator/anode assembly is not in contact with the separator/cathode assembly, and electrically conductive edge connections are made through these portions. Also provided are methods of preparing such lithium batteries.

24 Claims, 5 Drawing Sheets

NOT TO SCALE

(56) References Cited

U.S. PATENT DOCUMENTS

| | | | |
|---|---|---|---|
| 5,162,175 A | 11/1992 | Visco et al. | |
| 5,194,341 A | 3/1993 | Bagley et al. | |
| 5,314,765 A | 5/1994 | Bates | |
| 5,326,391 A | 7/1994 | Anderson et al. | |
| 5,350,645 A | 9/1994 | Lake et al. | |
| 5,415,954 A | 5/1995 | Gauthier et al. | |
| 5,418,091 A | 5/1995 | Gozdz et al. | |
| 5,439,760 A | 8/1995 | Howard et al. | |
| 5,549,717 A | 8/1996 | Takeuchi et al. | |
| 5,569,520 A | 10/1996 | Bates | |
| 5,597,659 A | 1/1997 | Morigaki et al. | |
| 5,691,005 A | 11/1997 | Morigaki et al. | |
| 5,731,104 A | 3/1998 | Ventura et al. | |
| 5,778,515 A | 7/1998 | Menon | |
| 5,824,434 A | 10/1998 | Kawakami et al. | |
| 5,840,087 A | 11/1998 | Gozdz et al. | |
| 5,882,721 A | 3/1999 | Delnick | |
| 5,894,656 A * | 4/1999 | Menon et al. | 29/623.1 |
| 5,948,464 A | 9/1999 | Delnick | |
| 6,148,503 A | 11/2000 | Delnick et al. | |
| 6,153,337 A | 11/2000 | Carlson et al. | |
| 6,162,563 A | 12/2000 | Miura et al. | |
| 6,183,901 B1 | 2/2001 | Ying et al. | |
| 6,194,098 B1 | 2/2001 | Ying et al. | |
| 6,268,087 B1 | 7/2001 | Kim et al. | |
| 6,277,514 B1 | 8/2001 | Ying et al. | |
| 6,287,720 B1 | 9/2001 | Yamashita et al. | |
| 6,306,545 B1 | 10/2001 | Carlson et al. | |
| 6,328,770 B1 | 12/2001 | Gozdz | |
| 6,344,293 B1 | 2/2002 | Geronov | |
| 6,410,182 B1 | 6/2002 | Ying et al. | |
| 6,423,444 B1 | 7/2002 | Ying et al. | |
| 6,451,484 B1 | 9/2002 | Han et al. | |
| 6,488,721 B1 * | 12/2002 | Carlson | 29/623.5 |
| 6,497,780 B1 | 12/2002 | Carlson | |
| 6,723,467 B2 | 4/2004 | Yoshida et al. | |
| 6,811,928 B2 | 11/2004 | Aihara et al. | |
| 7,014,948 B2 | 3/2006 | Lee et al. | |
| 7,066,971 B1 | 6/2006 | Carlson | |
| 7,070,632 B1 | 7/2006 | Visco et al. | |
| 7,081,142 B1 | 7/2006 | Carlson | |
| 7,115,339 B2 | 10/2006 | Nakajima et al. | |
| 7,160,603 B2 | 1/2007 | Carlson | |
| 7,378,185 B2 | 5/2008 | Fujikawa et al. | |
| 7,396,612 B2 | 7/2008 | Ohata et al. | |
| 7,402,184 B2 | 7/2008 | Ikuta et al. | |
| 7,419,743 B2 | 9/2008 | Fujikawa et al. | |
| 7,422,825 B2 | 9/2008 | Inoue et al. | |
| 7,470,488 B2 | 12/2008 | Lee et al. | |
| 7,560,193 B2 | 7/2009 | Ikuta et al. | |
| 7,575,606 B2 | 8/2009 | Fukumoto et al. | |
| 7,595,130 B2 | 9/2009 | Kawabata et al. | |
| 7,638,230 B2 | 12/2009 | Fujita et al. | |
| 7,638,241 B2 | 12/2009 | Lee et al. | |
| 7,662,517 B2 | 2/2010 | Lee et al. | |
| 7,674,559 B2 | 3/2010 | Min et al. | |
| 7,682,740 B2 | 3/2010 | Yong et al. | |
| 7,682,751 B2 | 3/2010 | Kato et al. | |
| 7,687,202 B2 | 3/2010 | Nishino et al. | |
| 7,695,870 B2 | 4/2010 | Park et al. | |
| 7,704,641 B2 | 4/2010 | Yong et al. | |
| 7,709,152 B2 | 5/2010 | Kim et al. | |
| 7,709,153 B2 | 5/2010 | Lee et al. | |
| 7,745,042 B2 | 6/2010 | Fujino et al. | |
| 7,754,375 B2 | 7/2010 | Fujikawa et al. | |
| 7,754,377 B2 | 7/2010 | Ohata et al. | |
| 7,758,998 B2 | 7/2010 | Ohata et al. | |
| 7,759,004 B2 | 7/2010 | Ikuta et al. | |
| 7,811,700 B2 | 10/2010 | Hennige et al. | |
| 7,816,038 B2 | 10/2010 | Ohata et al. | |
| 7,829,242 B2 | 11/2010 | Hörpel et al. | |
| 2001/0000485 A1 | 4/2001 | Ying et al. | |
| 2001/0038938 A1 | 11/2001 | Takahashi et al. | |
| 2001/0053475 A1 | 12/2001 | Ying et al. | |
| 2002/0092155 A1 | 7/2002 | Carlson et al. | |
| 2002/0141029 A1 | 10/2002 | Carlson et al. | |
| 2003/0035995 A1 | 2/2003 | Ohsaki et al. | |
| 2003/0118910 A1 | 6/2003 | Carlson | |
| 2003/0171784 A1 | 9/2003 | Dodd et al. | |
| 2004/0038090 A1 | 2/2004 | Faris | |
| 2004/0043295 A1 | 3/2004 | Rodriguez et al. | |
| 2004/0185335 A1 | 9/2004 | Carlson | |
| 2004/0188880 A1 | 9/2004 | Bauer et al. | |
| 2004/0241540 A1 | 12/2004 | Tsutsumi et al. | |
| 2005/0221190 A1 | 10/2005 | Sudano et al. | |
| 2005/0266305 A1 | 12/2005 | Ohata et al. | |
| 2006/0008698 A1 | 1/2006 | Kim et al. | |
| 2006/0127753 A1 | 6/2006 | Nakashima et al. | |
| 2006/0172158 A1 | 8/2006 | Min et al. | |
| 2006/0172185 A1 | 8/2006 | Mimura | |
| 2006/0177732 A1 | 8/2006 | Visco et al. | |
| 2006/0222954 A1 | 10/2006 | Skotheim et al. | |
| 2006/0275661 A1 | 12/2006 | Kim et al. | |
| 2007/0065714 A1 | 3/2007 | Hambitzer et al. | |
| 2007/0108120 A1 | 5/2007 | Carlson | |
| 2007/0110990 A1 | 5/2007 | Carlson | |
| 2007/0111070 A1 | 5/2007 | Carlson | |
| 2007/0178384 A1 * | 8/2007 | Kajita et al. | 429/251 |
| 2007/0184350 A1 | 8/2007 | Kim et al. | |
| 2007/0189959 A1 | 8/2007 | Carlson et al. | |
| 2007/0190427 A1 | 8/2007 | Carlson et al. | |
| 2007/0204458 A1 | 9/2007 | Fujita et al. | |
| 2007/0243460 A1 | 10/2007 | Carlson et al. | |
| 2007/0269714 A1 | 11/2007 | Watanabe et al. | |
| 2008/0032197 A1 | 2/2008 | Horpel et al. | |
| 2008/0166202 A1 | 7/2008 | Dunlap et al. | |
| 2008/0182174 A1 | 7/2008 | Carlson et al. | |
| 2009/0017380 A1 * | 1/2009 | Honda et al. | 429/218.1 |
| 2009/0087728 A1 | 4/2009 | Less et al. | |
| 2009/0246636 A1 | 10/2009 | Chiang et al. | |
| 2010/0261065 A1 | 10/2010 | Babinec et al. | |
| 2011/0097623 A1 | 4/2011 | Marinis, Jr. et al. | |
| 2011/0281171 A1 | 11/2011 | Yong et al. | |

FOREIGN PATENT DOCUMENTS

| | | |
|---|---|---|
| EP | 0523840 B1 | 1/1993 |
| EP | 0600718 B1 | 6/1994 |
| EP | 0814520 A2 | 12/1997 |
| EP | 0836238 B1 | 4/1998 |
| EP | 0848435 B1 | 6/1998 |
| EP | 0875950 A2 | 11/1998 |
| EP | 0892449 A1 | 1/1999 |
| EP | 1156544 | 11/2011 |
| JP | H06140077 | 5/1994 |
| JP | H0927343 | 1/1997 |
| JP | H10214639 | 8/1998 |
| JP | 2011233144 A | 8/1999 |
| JP | 2002042882 | 2/2002 |
| JP | 2003223926 | 8/2003 |
| JP | 2005235695 | 2/2005 |
| JP | 2005022674 A1 | 3/2005 |
| JP | 2007258160 | 10/2007 |
| JP | 2008041404 | 2/2008 |
| JP | 2008123988 | 5/2008 |
| WO | 9102385 A1 | 2/1991 |
| WO | 9103080 A1 | 3/1991 |
| WO | 9931751 | 6/1999 |
| WO | 9933125 A1 | 7/1999 |
| WO | 9957770 A1 | 11/1999 |
| WO | 0076011 A | 12/2000 |
| WO | 0139293 | 5/2001 |
| WO | 2009014388 | 1/2009 |
| WO | 2009026467 A1 | 2/2009 |
| WO | 2010138176 | 12/2010 |
| WO | 2010138177 | 12/2010 |
| WO | 2010138179 | 12/2010 |
| WO | 2013146126 | 10/2013 |

* cited by examiner

NOT TO SCALE

NOT TO SCALE

NOT TO SCALE

NOT TO SCALE

NOT TO SCALE

NOT TO SCALE

NOT TO SCALE

NOT TO SCALE

NOT TO SCALE

BATTERIES UTILIZING ELECTRODE COATINGS DIRECTLY ON NANOPOROUS SEPARATORS

RELATED APPLICATIONS

The present application is a continuation-in-part of and claims the benefit of and priority to PCT Application No. PCT/US2010/001536, filed May 26, 2010, which claims the benefit under 35 U.S.C. §119(e) of U.S. Provisional Patent Application No. 61/217,132, filed May 26, 2009. The present application is also a continuation-in-part of and claims the benefit of and priority to PCT Application No. PCT/US2010/001537, filed May 26, 2010, which claims the benefit under 35 U.S.C. §119(e) of U.S. Provisional Patent Application No. 61/217,132, filed May 26, 2009. The present application is also a continuation-in-part of and claims the benefit of and priority to PCT Application No. PCT/US2010/001539, filed May 26, 2010, which claims the benefit under 35 U.S.C. §119(e) of U.S. Provisional Patent Application No. 61/217,132, filed May 26, 2009. The present application is also a continuation-in-part of and claims the benefit of and priority to PCT Application No. PCT/US2010/001535, filed May 26, 2010, which claims the benefit under 35 U.S.C. §119(e) of U.S. Provisional Patent Application No. 61/217,132, filed May 26, 2009. The entireties of each of the above-referenced patent applications are incorporated herein by reference.

FIELD OF THE INVENTION

The present invention relates generally to the field of batteries and other electric current producing cells. More particularly, this invention pertains to lithium batteries that utilize nanoporous separators and to methods of preparing lithium batteries by taking advantage of the nanoporous structure of the separator to overlay the other layers of the battery in a desired configuration.

BACKGROUND OF THE INVENTION

Lithium batteries, including rechargeable or secondary lithium ion batteries, non-rechargeable or primary lithium batteries, and other types such as lithium-sulfur batteries, are typically made by interleaving a plastic separator, a metal substrate with a cathode layer coated on both sides, another plastic separator, and another metal substrate with an anode layer coated on both sides. To maintain the alignment of the strips of these materials and for other quality reasons, this interleaving is usually done on automatic equipment, which is complex and expensive. Also, in order to achieve sufficient mechanical strength and integrity, the separators and the metal substrates are relatively thick, such as 10 microns in thickness or more. For example, a typical thickness of the copper metal substrate for the anode coating layers is 10 microns, a typical thickness of the aluminum metal substrate for the cathode coating layers is 12 microns, and the plastic separators typically have thicknesses ranging from 12 to 20 microns. These thick separators and metal substrates are not electrochemically active and thus lower the volume of the electroactive material in the electrodes of the lithium batteries. This limits the energy density and power density of the lithium batteries.

Among the new applications for lithium batteries are high power batteries for hybrid, plug-in hybrid, and electric vehicles. In contrast to the cylindrical metal cells used in lithium batteries for portable computers and other applications, many of the lithium batteries for vehicles are of a flat or prismatic design. Also, the lithium batteries for vehicles need to be economical. Potential approaches to make higher energy and more economical lithium batteries for vehicles and other applications include greatly increasing the proportion or percentage of the volume of the electroactive material in each battery and reducing the complexity and expense of the automated equipment to fabricate the battery.

It would be advantageous if a lithium battery comprised separator and metal substrate layers that were much thinner than are currently used and thereby had a greater content of electroactive material. It would be particularly advantageous if this lithium battery could be fabricated on less complex and less expensive automated processing equipment than, for example, the winding equipment utilized for portable computer batteries, and furthermore was particularly adapted for making flat or prismatic batteries.

SUMMARY OF THE INVENTION

This invention pertains to batteries and other electric current producing cells, especially lithium batteries, that utilize nanoporous separators, particularly heat resistant separators with dimensional stability at temperatures at and above 200° C., and to methods of preparing lithium batteries by taking advantage of the nanoporous structure of the separator to directly coat the other layers of the battery in a desired thickness and configuration on the separator.

One aspect of the present invention pertains to a lithium battery comprising (a) a separator/cathode assembly, wherein the separator/cathode assembly comprises a cathode current collector layer interposed between a first cathode layer and a second cathode layer and a porous separator layer on the side of the first cathode layer on the side opposite to the cathode current collector layer, and wherein the first cathode layer is coated directly on the separator layer, (b) a separator/anode assembly, wherein the separator/anode assembly comprises an anode current collector layer interposed between a first anode layer and a second anode layer and a porous separator layer on the side of the first anode layer on the side opposite to the anode current collector layer, and wherein the first anode layer is coated directly on the separator layer, and (c) an electrolyte, wherein the battery comprises alternating layers of the separator/cathode assembly and the separator/anode assembly. In one embodiment, a portion of the separator/cathode assembly is not in contact with the separator/anode assembly.

In one embodiment of the lithium batteries of this invention, the portion of the separator/cathode assembly that is not in contact with the separator/anode assembly is in contact with an additional one or more portions of the separator/cathode assembly that are not in contact with the separator/anode assembly. In one embodiment, a device having electrically conductive pins is in electrical contact with the portion of the separator/cathode assembly and the additional one or more portions of the separator/cathode assembly and is not in electrical contact with any portion of the separator/anode assembly.

In one embodiment of the lithium batteries of the present invention, a portion of the separator/anode assembly is not in contact with the separator/cathode assembly. In one embodiment, the portion of the separator/anode assembly is in contact with one or more portions of the separator/anode assembly that are not in contact with the separator/cathode assembly. In one embodiment, a device having electrically conductive pins is in electrical contact with the portion of the separator/anode assembly and the additional one or more portions of the separator/anode assembly and is not in electrical contact with any portion of the separator/cathode assembly. In one embodiment, a portion of the separator/cathode assembly that is not in contact with the separator/anode assembly is in contact with an additional one or more portions of the separator/cathode assembly that are not in contact with the separator/anode assembly. In one embodiment, a device having electrically conductive pins is in electrical contact with the portion of the separator/cathode assembly and the additional one or more portions of the separator/cathode assembly and is not in electrical contact with any portion of the separator/anode assembly.

In one embodiment of the lithium batteries of this invention, the cathode current collector layer is coated directly on the first cathode layer. In one embodiment, the surface of the first cathode layer adjacent to the separator layer has a contour matching the contour of the surface of the separator layer adjacent to the first cathode layer, and the contour of the surface of the separator layer is the same as before the coating of the first cathode layer on the separator layer. In one embodiment, the first cathode layer comprises electrode particles selected from the group consisting of electroactive particles and electrically conductive particles, and the electrode particles are not present in the separator layer adjacent to the first cathode layer. In one embodiment, the separator layer of the separator/cathode assembly comprises separator particles, and the separator particles are not present in the first cathode layer adjacent to the separator layer. In one embodiment, the cathode current collector layer of the separator/cathode assembly comprises an aluminum layer. In one embodiment, the thickness of the aluminum layer is less than 3 microns.

In one embodiment of the lithium batteries of the present invention, the anode current collector layer is coated directly on the first anode layer. In one embodiment, the surface of the first anode layer adjacent to the separator layer has a contour matching the contour of the surface of the separator layer adjacent to the first anode layer, and the contour of the surface of the separator layer is the same as before the coating of the first anode layer on the separator layer. In one embodiment, the first anode layer comprises electrode particles selected from the group consisting of electroactive particles and electrically conductive particles, and the electrode particles are not present in the separator layer adjacent to the first anode layer. In one embodiment, the separator layer of the separator/anode assembly comprises separator particles, and the separator particles are not present in the first anode layer adjacent to the separator layer. In one embodiment, the anode current collector layer of the separator/anode assembly comprises a metal layer selected from the group consisting of a copper layer and a nickel layer. In one embodiment, the thickness of the metal layer is less than 3 microns.

In one embodiment of the lithium batteries of this invention, the separator layer of both the separator/cathode assembly and the separator/anode assembly has a pore diameter of less than 0.2 microns, and preferably less than 0.1 microns. In one embodiment, the separator layer of both the separator/cathode assembly and the separator/anode assembly comprises pores having an average pore diameter of less than 0.2 microns, and preferably less than 0.1 microns. In one embodiment, the separator layer of both the separator/cathode assembly and the separator/anode assembly has a thickness of less than 9 microns, and preferably less than 6 microns. In one embodiment, the separator layer of both the separator/cathode assembly and the separator/anode assembly comprises a porous layer comprising aluminum boehmite.

Another aspect of the present invention pertains to a lithium battery comprising (a) a separator/cathode assembly, wherein the separator/cathode assembly comprises a cathode current collector layer interposed between a first cathode layer and a second cathode layer and a porous separator layer on the side of the first cathode layer on the side opposite to the cathode current collector layer, and wherein the first cathode layer is coated directly on the separator layer, (b) a separator/anode assembly, wherein the separator/anode assembly comprises an anode layer and a porous separator layer on one side of the anode layer, and wherein the anode layer is coated directly on the separator layer, and (c) an electrolyte, wherein the battery comprises alternating layers of the separator/cathode assembly and the separator/anode assembly. In one embodiment, the anode layer comprises lithium metal. In one embodiment, the first cathode layer and second cathode layer comprise sulfur or a polysulfide of the formula, $S_x^{2-}$, wherein x is an integer from 2 to 8.

Another aspect of this invention relates to a method of making a lithium battery comprising the steps of (a) coating a porous separator layer on a substrate; (b) coating a first cathode layer directly on a first portion of the separator layer; (c) coating one or more cathode current collector layers directly on the first cathode layer; (d) coating a second cathode layer directly on the one or more cathode current collector layers; (e) coating a first anode layer directly on a second portion of the separator layer; (f) coating one or more anode current collector layers directly on the first anode layer; and (g) coating a second anode layer directly on the one or more anode current collector layers. In one embodiment, after step (g), there is a further step (h) of delaminating the substrate from the first and second portions of the separator layer to make a separator/cathode assembly and a separator/anode assembly. In one embodiment, after step (h), there is a further step (i) of interleaving the separator/cathode assembly with the separator/anode assembly to form a dry separator/electrode cell. In one embodiment, the separator/cathode assembly and the separator/anode assembly are in a sheet configuration prior to the interleaving step.

In one embodiment, after step (i), a portion of the separator/cathode assembly is not in contact with the separator/anode assembly and a portion of the separator/anode assembly is not in contact with the separator/cathode assembly, and a first device with electrically conductive pins electrically connects two or more of the portions of the separator/cathode assembly and a second device with electrically conductive pins electrically connects two or more of the portions of the separator/anode assembly. In one embodiment, there are further steps of (1) enclosing said dry separator/electrode cell in a casing and (2) filling with electrolyte and sealing.

In one embodiment of the methods of preparing lithium batteries of this invention, at least one of the one or more cathode current collector layers of step (c) comprises a metal layer and the thickness of the metal layer is less than 3 microns. In one embodiment, at least one of the one or more anode current collector layers of step (f) comprises a metal layer and the thickness of the metal layer is less than 3 microns. In one embodiment, the separator layer has a pore diameter of less than 0.2 microns, and preferably less than 0.1 microns. In one embodiment, the separator layer has a thickness of less than 9 microns, and preferably less than 6 microns.

BRIEF DESCRIPTION OF THE DRAWINGS

For the purpose of illustrating the invention, particular arrangements and methodologies are shown in the drawings. It should be understood, however, that the invention is not limited to the precise arrangements shown or to the methodologies of the detailed description.

DETAILED DESCRIPTION OF THE INVENTION

Figure 1:
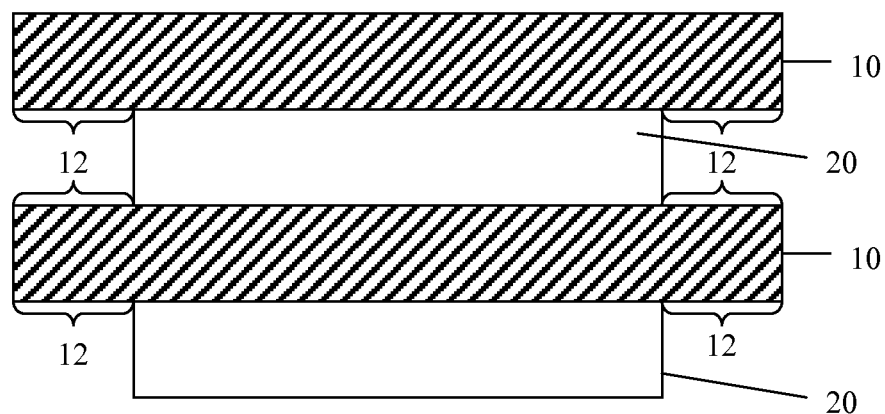
FIG. 1 shows a cross-section view of the alternating layers of a separator/cathode assembly and a separator/anode assembly where a portion of the separator/cathode assembly is not in contact with the separator/anode assembly.

The lithium batteries and methods of preparing lithium batteries of the present invention provide a flexible and effective approach to lithium batteries with higher energy and power densities and with lower manufacturing and capital equipment costs.

One aspect of the present invention pertains to a lithium battery comprising (a) a separator/cathode assembly, wherein the separator/cathode assembly comprises a cathode current collector layer interposed between a first cathode layer and a second cathode layer and a porous separator layer on the side of the first cathode layer opposite to the cathode current collector layer, and wherein the first cathode layer is coated directly on the separator layer, (b) a separator/anode assembly, wherein the separator/anode assembly comprises an anode current collector layer interposed between a first anode layer and a second anode layer and a porous separator layer on the side of the first anode layer opposite to the anode current collector layer, and wherein the first anode layer is coated directly on the separator layer, and (c) an electrolyte, wherein the battery comprises alternating layers of the separator/cathode assembly and the separator/anode assembly. In one embodiment, a portion of the separator/cathode assembly is not in contact with the separator/anode assembly.

As used herein, the word "battery" pertains to both a single electric current producing cell and to multiple electric current producing cells combined in a casing or pack. As used herein, the term "lithium battery" refers to all types of lithium batteries known in the art, including, but not limited to, rechargeable or secondary lithium ion batteries, non-rechargeable or primary lithium batteries, and other types such as lithium-sulfur batteries.

As used herein, the term "current collector layer" refers to one or more current collection layers that are adjacent to an electrode layer. This includes, but is not limited to, a single conductive metal layer or substrate and a single conductive metal layer or substrate with an overlying conductive coating, such as a carbon black-based polymer coating. Examples of a conductive metal substrate as the current collector are a metal substrate comprising aluminum, which is typically used as the current collector layer and substrate for the positive electrode or cathode layer, and a metal substrate comprising copper, which is typically used as the current collector layer and substrate for the negative electrode or anode layer. The current collector layers of both the separator/cathode assembly and the separator/anode assembly may comprise an electrically conductive material selected from the group consisting of electrically conductive metals including metal pigments or particles, electrically conductive carbons including carbon black and graphite pigments, and electrically conductive polymers. These electrically conductive materials may be combined with an organic polymer for added mechanical strength and flexibility to form the current collector layer.

As used herein, the term "electrode layer" refers to a layer of the battery that comprises electroactive material. When the electrode layer is where the lithium is present in the case of primary lithium batteries or, in the case of rechargeable lithium batteries, is formed during the charging of the battery and is oxidized to lithium ions during the discharging of the battery, the electrode layer is called the anode or negative electrode layer. The other electrode of opposite polarity is called the cathode or positive electrode layer. Any of the electroactive materials that are useful in lithium batteries may be utilized in the electrode layers for the lithium batteries of this invention. Examples include, but are not limited to, lithium cobalt oxide, lithium manganese oxide, lithium iron phosphate, and sulfur as electroactive materials in the cathode layers and lithium titanate, lithium-intercalated carbon, lithium-intercalated graphite, and lithium metal as electroactive materials in the anode layers.

As used herein, the word "electrolyte" refers to any of the electrolytes that are useful in lithium batteries. Suitable electrolytes include, but are not limited to, liquid electrolytes, gel polymer electrolytes, and solid polymer electrolytes. Suitable liquid electrolytes include, but are not limited to, $LiPF_6$ solutions in a mixture of organic solvents, such as, for example, a mixture of ethylene carbonate, propylene carbonate, and ethyl methyl carbonate.

FIG. 1 shows an example of a cross-section view (not to scale) of the alternating layers of a separator/cathode assembly 10 and a separator/anode assembly 20 where a portion 12 of the separator/cathode assembly 10 is not in contact with the separator/anode assembly 20. One purpose for having a portion of the separator/cathode assembly that is not in contact with the separator/anode assembly, such as, for example, the portion of the separator/cathode assembly having no overlying or underlying layers of the separator/anode assembly, is to provide for an area of the separator/cathode assembly where the individual cathode current collector layers may be directly electrically connected to each other for more efficient operation of the lithium battery.

Figure 2:
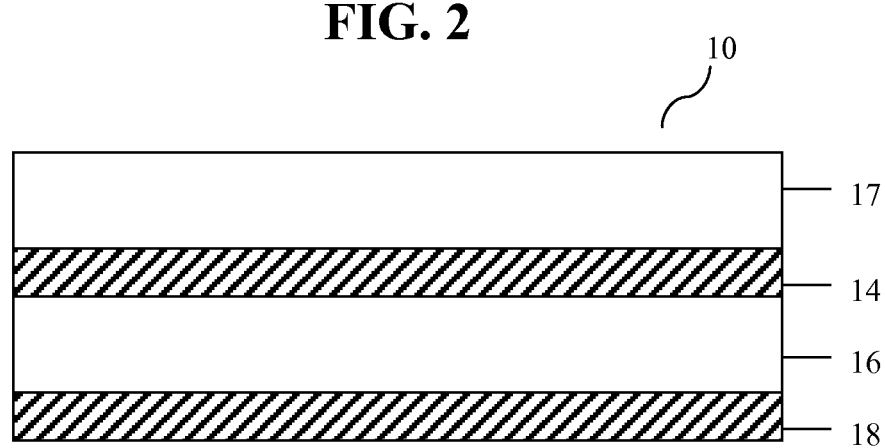
FIG. 2 shows a cross-section view of a separator/cathode assembly with a current collector layer interposed between a first cathode layer and a second cathode layer and with a porous separator layer on one side of the first cathode layer.
Figure 3:
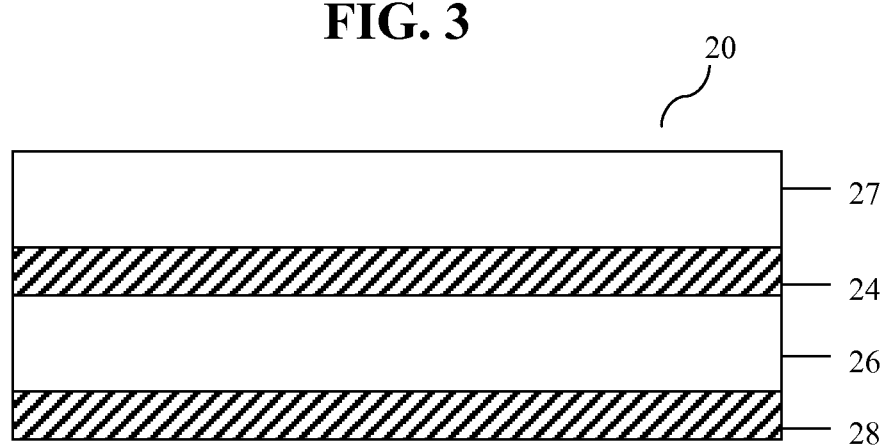
FIG. 3 shows a cross-section view of a separator/anode assembly with a current collector layer interposed between a first anode layer and a second anode layer and with a porous separator layer on one side of the first anode layer.

FIG. 2 shows an example of a cross-section view (not to scale) of a separator/cathode assembly 10 of this invention with a cathode current collector layer 14 interposed between a first cathode layer 16 and a second cathode layer 17 and with a separator layer 18 on one side of the first cathode layer 16. FIG. 3 shows an example of a cross-section view (not to scale) of a separator/anode assembly 20 of this invention with an anode current collector layer 24 interposed between a first anode layer 26 and a second anode layer 27 and with a separator layer 28 on one side of the first anode layer 26.

In one embodiment of the lithium batteries of this invention, the portion of the separator/cathode assembly that is not in contact with the separator/anode assembly is in contact with an additional one or more portions of the separator/cathode assembly that are not in contact with the separator/anode assembly. In one embodiment, a device having electrically conductive pins is in electrical contact with the portion of the separator/cathode assembly and the additional one or more portions of the separator/cathode assembly and is not in electrical contact with the separator/anode assembly.

As used herein, the terms "device having electrically conductive pins" and "electrically conductive pins" refer to any of the mechanical configurations that can electrically connect two or more portions of the separator/cathode assembly or two or more portions of the separator/anode assembly. Examples include, but are not limited to, metal pins, metal rods, metal clamps with or without metal protrusions to penetrate through multiple layers, and metal screws, and to these metal parts in combination with any parts of the casing that have designs or openings to position and hold in place these metal edge connection and external electrical connection materials. The metal may be nickel or any other electrically conductive metal or non-metal material that is compatible and stable with the particular electrode layer, current collector layer, and electrolyte.

Figure 4:
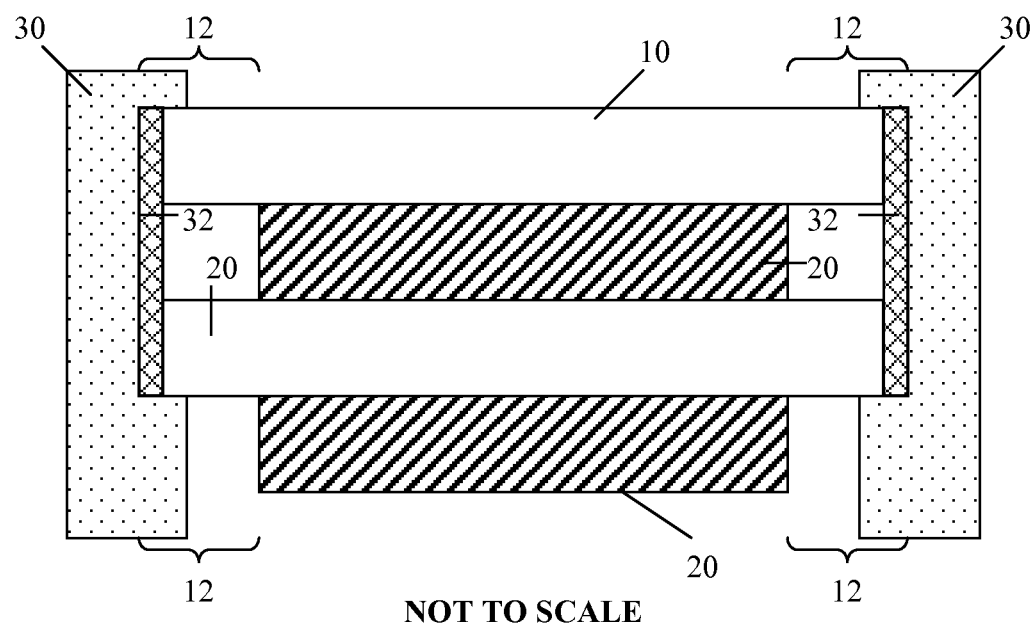
FIG. 4 shows a cross-section view of a device with electrically conductive pins that makes electrical connections between a portion of the separator/cathode assembly without making electrical connection with the separator/anode assembly.

FIG. 4 shows an example of a cross-section view (not to scale) of a device 30 with electrically conductive pins 32 that makes electrical connections between two or more portions 12 of the separator/cathode assembly 10 without making electrical connection with the separator/anode assembly 20. The electrically conductive pins 32 are preferably positioned, inserted through, and held in position by openings or holes in the device 30. The part of device 30 that is not the electrically conductive pins may be a non-conductive plastic material that is optionally integrated into the casing of the battery or, alternatively, may be an electrically conductive material, such as a metal or metal particles in a plastic material, that is useful in making the electrical connections of the battery to the external circuit.

Figure 5:
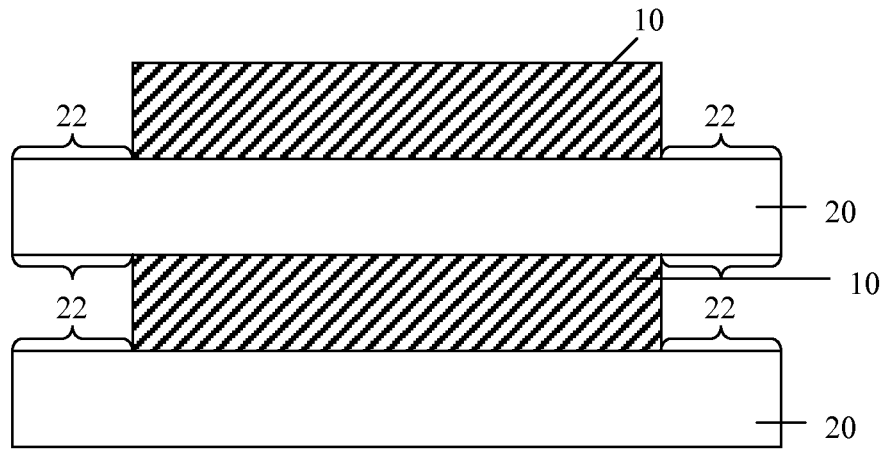
FIG. 5 shows a cross-section view of the alternating layers of a separator/cathode assembly and a separator/anode assembly where a portion of the separator/anode assembly is not in contact with the separator/cathode assembly.
Figure 6:
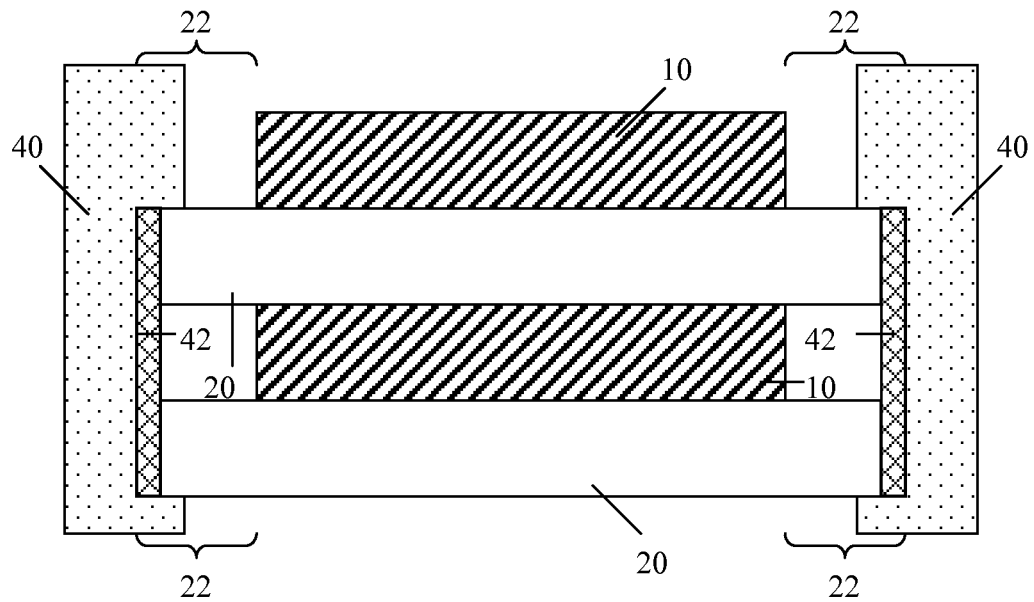
FIG. 6 shows a cross-section view of a device with electrically conductive pins that makes electrical connections between a portion of the separator/anode assembly without making electrical connection with the separator/cathode assembly.
Figure 7:
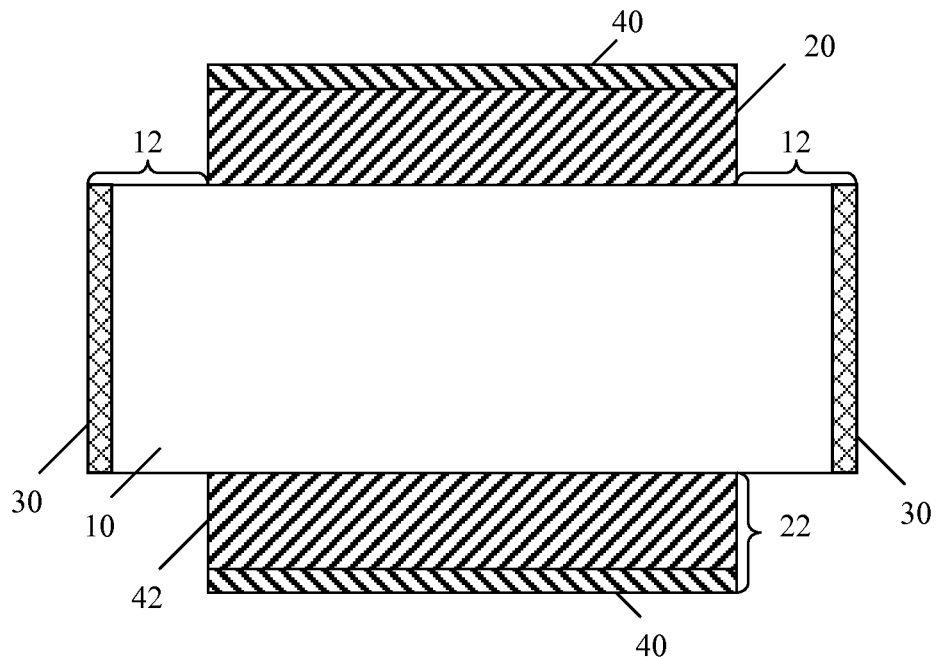
FIG. 7 shows a top-down view of the alternating layers where a first device, as shown in FIG. 4, is in electrical contact with the portion of the separator/cathode assembly, as shown in FIG. 1, and with an additional one or more underlying portions of the separator/cathode assembly, and where a second device, as shown in FIG. 6, is in electrical contact with the portion of the separator/anode assembly, as shown in FIG. 5, and with an additional one or more underlying portions of the separator/anode assembly.

In one embodiment of the lithium batteries of the present invention, a portion of the separator/anode assembly is not in contact with the separator/cathode assembly. FIG. 5 shows an example of a cross-section view (not to scale) of the alternating layers of a separator/cathode assembly 10 and a separator/anode assembly 20 where a portion 22 of the separator/anode assembly 20 is not in contact with the separator/cathode assembly 10. Similarly to that described above for the separator/cathode assembly, one purpose for having a portion of the separator/anode assembly that is not in contact with the separator/cathode assembly, such as, for example, the portion of the separator/anode assembly having no overlying or underlying layers of the separator/cathode assembly, is to provide for an area of the separator/anode assembly where the individual current collector layers may be directly electrically connected to each other for more efficient operation of the lithium battery. In one embodiment, the portion of the separator/anode assembly that is not in contact with the separator/cathode assembly is in contact with one or more portions of the separator/anode assembly that are not in contact with the separator/cathode assembly. In one embodiment, a device having electrically conductive pins is in electrical contact with the portion of the separator/anode assembly and the additional one or more portions of the separator/anode assembly and is not in electrical contact with the separator/cathode assembly. FIG. 6 shows an example of a cross-section view (not to scale) of a device 40 with electrically conductive pins 42 that makes electrical connections between a portion 22 of the separator/anode assembly 20 without making electrical connection with the separator/cathode assembly 10. The electrically conductive pins 42 are preferably positioned, inserted through, and held in position by openings or holes in the device 40. The part of device 40 that is not the electrically conductive pins may be a non-conductive plastic material that is optionally integrated into the casing of the battery or, alternatively, may be an electrically conductive material, such as a metal or metal particles in a plastic material, that is useful in making the electrical connections of the battery to the external circuit. In one embodiment, a portion of the separator/cathode assembly that is not in contact with the separator/anode assembly is in contact with an additional one or more portions of the separator/cathode assembly that are not in contact with the separator/anode assembly. In one embodiment, a device having electrically conductive pins is in electrical contact with the portion of the separator/cathode assembly and the additional one or more portions of the separator/cathode assembly and is not in electrical contact with the separator/anode assembly. FIG. 7 shows an example of a top-down view (not to scale) of the alternating layers where device 30, as shown in FIG. 4, is in electrical contact with the portion 12 of the separator/cathode assembly 10, as shown in FIG. 1, and with an additional one or more underlying portions 12 of the separator/cathode assembly 10, and where device 40, as shown in FIG. 6, is in electrical contact with the portion 22 of the separator/anode assembly 20, as shown in FIG. 5, and with an additional one or more underlying portions 22 of the separator/anode assembly 20.

In one embodiment of the lithium batteries of this invention, the cathode current collector layer is coated directly on the first cathode layer. In one embodiment, the second cathode layer is coated directly on the first cathode current collector layer. In one embodiment, the surface of the first cathode layer adjacent to the separator layer has a contour matching the contour of the surface of the separator layer adjacent to the first cathode layer, and the contour of the surface of the separator layer is the same as before the coating of the first cathode layer on the separator layer. In one embodiment, the first cathode layer comprises electrode particles selected from the group consisting of electroactive particles and electrically conductive particles, and the electrode particles are not present in the separator layer adjacent to the first cathode layer. In one embodiment, the separator layer of the separator/cathode assembly comprises separator particles, and the separator particles are not present in the first cathode layer adjacent to the separator layer. In one embodiment, the cathode current collector layer of the separator/cathode assembly comprises an aluminum layer. In one embodiment, the thickness of the aluminum layer is less than 3 microns.

In one embodiment of the lithium batteries of the present invention, the anode current collector layer is coated directly on the first anode layer. In one embodiment, the second anode layer is coated directly on the anode current collector layer. In one embodiment, the surface of the first anode layer adjacent to the separator layer has a contour matching the contour of the surface of the separator layer adjacent to the first anode layer, and the contour of the surface of the separator layer is the same as before the coating of the first anode layer on the separator layer. In one embodiment, the first anode layer comprises electrode particles selected from the group consisting of electroactive particles and electrically conductive particles, and the electrode particles are not present in the separator layer adjacent to the first anode layer. In one embodiment, the separator layer of the separator/anode assembly comprises separator particles, and the separator particles are not present in the first anode layer adjacent to the separator layer. In one embodiment, the anode current collector layer of the separator/anode assembly comprises a metal layer selected from the group consisting of a copper layer and a nickel layer. In one embodiment, the thickness of the metal layer is less than 3 microns.

In one embodiment of the cathode current collector layers and the anode current collector layers of the lithium batteries of the present invention, the current collector layer comprises an electrically conductive material selected from the group consisting of electrically conductive metals, electrically conductive carbons, and electrically conductive polymers. In one embodiment, the current collector layer comprises two or more layers coated directly on the first cathode or the first anode layer, and at least one of the two or more layers comprises an electrically conductive material comprising carbon. In one embodiment, the thickness of the current collector layer is less than 3 microns.

In one embodiment of the lithium batteries of this invention, the separator layer of both the separator/cathode assembly and the separator/anode assembly has a pore diameter of less than 0.2 microns, and preferably less than 0.1 microns. In one embodiment, the separator layer of both the separator/cathode assembly and the separator/anode assembly comprises pores having an average pore diameter of less than 0.2 microns, and preferably less than 0.1 microns. In one embodiment, the separator layer of both the separator/cathode assembly and the separator/anode assembly has a thickness of less than 9 microns, and preferably less than 6 microns. In one embodiment, the separator layer comprises a porous layer comprising a xerogel layer or xerogel membrane, including, but not limited to, a porous layer comprising aluminum boehmite. In one embodiment, the separator layer of both the separator/cathode assembly and the separator/anode assembly comprises separator particles selected from the group consisting of inorganic oxide particles such as, for example, aluminum oxides and aluminum boehmites; inorganic nitride particles; inorganic carbonate particles; inorganic sulfate particles; and polymer particles, such as polyolefin beads or fluoropolymer beads.

By the term "xerogel layer", as used herein, is meant a porous layer that was formed by a xerogel or sol gel process of drying a colloidal sol liquid to form a solid gel material. By the term "xerogel membrane", as used herein, is meant a membrane that comprises at least one xerogel layer where the pores of the xerogel layer are continuous from one side of the layer to the other side of the layer. Xerogel layers and membranes typically comprise inorganic oxide materials, such as aluminum oxides, aluminum boehmites, and zirconium oxides, as the sol gel materials. Examples of suitable xerogel membranes for the present invention include, but are not limited to, the xerogel membranes described in U.S. Pat. Nos. 6,153,337 and 6,306,545 to Carlson et al. and U.S. Pat. Nos. 6,488,721 and 6,497,780 to Carlson.

Another aspect of the present invention pertains to a lithium battery comprising (a) a separator/cathode assembly, wherein the separator/cathode assembly comprises a cathode current collector layer interposed between a first cathode layer and a second cathode layer and a porous separator layer on the side of the first cathode layer on the side opposite to the cathode current collector layer, and wherein the first cathode layer is coated directly on the separator layer, (b) a separator/anode assembly, wherein the separator/anode assembly comprises an anode layer and a porous separator layer on one side of the anode layer, and wherein the anode layer is coated directly on the separator layer, and (c) an electrolyte, wherein the battery comprises alternating layers of the separator/cathode assembly and the separator/anode assembly. In one embodiment, the anode layer comprises lithium metal. With some anode layers, such as, for example, those that are highly electrically conductive and contain a high content of lithium or an alloy of lithium or of another electroactive anode metal or metal alloy, an anode current collector layer may not be required. In these cases, the steps of coating the anode current collector layer and coating the second anode layer may be eliminated, and the first anode layer may be coated directly on the porous separator layer. This coating of the first anode layer may be a vapor deposition of the lithium or other metal composition of the anode layer or may be a coating or deposition by any of the other methods known in the art of metal anode layers for lithium batteries. In one embodiment, the first and second cathode layers comprise sulfur or a polysulfide of the formula, $S_x^{2-}$, wherein x is an integer from 2 to 8. Examples of lithium batteries that may not require an anode current collector layer and a second anode layer include lithium-sulfur batteries where the anode is typically a layer of lithium metal. If additional battery layers need to be coated on one or both sides of the lithium or other metal anode layer, these layers may be coated in additional coating steps directly on the separator layer or on the metal anode layer.

Another aspect of this invention relates to a method of making a lithium battery comprising the steps of (a) coating a porous separator layer on a substrate; (b) coating a first cathode layer directly on a first portion of the separator layer; (c) coating one or more cathode current collector layers directly on the first cathode layer; (d) coating a second cathode layer directly on the one or more cathode current collector layers; (e) coating a first anode layer directly on a second portion of the separator layer; (f) coating one or more anode current collector layers directly on the first anode layer; and (g) coating a second anode layer directly on the one or more anode current collector layers. In one embodiment, after step (g), there is a further step (h) of delaminating the substrate from the first and second portions of the separator layer to make a separator/cathode assembly and a separator/anode assembly. In one embodiment, after step (h), there is a further step (i) of interleaving the separator/cathode assembly with the separator/anode assembly to form a dry separator/electrode cell. In one embodiment, the separator/cathode assembly and the separator/anode assembly are in a sheet configuration prior to the interleaving step.

In one embodiment of the methods of making a lithium battery of this invention, step (a) is a step of providing a porous separator layer. In one embodiment, step (a) comprises coating a porous separator layer on a substrate. In one embodiment, the substrate is a release substrate, and, after step (d), there is a further step of delaminating the substrate from the separator layer to form both the separator/cathode assembly and the separator/anode assembly. In one embodiment, the substrate of step (a) is a porous substrate, wherein a porous separator layer is coated directly on a porous substrate. In one embodiment, the porous substrate is selected from the group consisting of porous polymer films and porous non-woven polymer fiber substrates. Examples of a porous substrate include, but are not limited to, porous polyethylene films and porous polypropylene films such as, for example, are sold under the trade name of CELGARD by Polypore, Inc., Charlotte, N.C. In order to minimize the overall thickness of the separator, the porous substrate may be 5 to 12 microns in thickness and the porous separator layer coated on the porous substrate may be 2 to 10 microns in thickness. If the porous substrate has sufficient mechanical strength to be handled on the coating equipment as a free standing film or with the use of a temporary release liner and has the properties needed for a lithium battery separator, the use of a porous substrate in step (a) eliminates the need for a later delamination step because the porous substrate becomes a layer of the battery and functions as a separator. The porous separator layer coated directly on the porous substrate has the additional benefits of providing a layer of very small pores that prevents the penetration of any of the particles of the electrode layer directly coated on it and the added benefits of providing a safer and more heat resistant separator with dimensional stability at and above 200° C.

Examples of suitable separator coatings for the present invention include, but are not limited to, the separator coatings described in U.S. Pat. Nos. 6,153,337 and 6,306,545 to Carlson et al. and U.S. Pat. Nos. 6,488,721 and 6,497,780 to Carlson. These separator coatings may be coated from an aqueous mix or a solvent mix onto a variety of substrates, such as, for example, silicone-treated plastic and paper substrates, polyester film substrates, polyolefin-coated papers, metal substrates, porous polyolefin films, and porous non-woven polymer fiber substrates. The advantages of coating the separator onto a substrate for this invention include, but are not limited to, (a) that the other layers of the lithium battery may be coated or laminated overlying this separator coating layer and then subsequently the substrate may be removed by delaminating to provide a dry stack of battery layers, (b) the coating process for the separator lends itself to making thinner separators than are typically available from an extrusion process for the separator, and (c) the coated separator layer may be nanoporous with pore diameters of less than 0.1 microns that are too small to allow any penetration of the particles of the electrode and other overlying coating layers into the separator layer. Even separator layers with pore diameters up to 0.2 microns have been found to prevent the penetration into the separator layer of any particles of carbon black pigments as are typically used in lithium batteries.

The electrode coating layer may be coated on the full surface of the separator layer, or in lanes or strips on the separator layer, or in patches or rectangle shapes on the separator layer, depending on the requirements of the end use and the specific approach to doing the current collection from the layers of each electrode without having a short circuit due to electrically contacting any layers of the electrode and current collector layers of opposite polarity. Cathode coating layers typically are coated from a pigment dispersion comprising an organic solvent, such as N-methyl pyrrolidone (NMP), and contain the electroactive or cathode active material in a pigment form, a conductive carbon pigment, and an organic polymer. Anode coating layers typically are coated from a pigment dispersion comprising an organic solvent or water, and contain the electroactive or anode active material in a pigment form, a conductive carbon pigment, and an organic polymer. These electrode pigments are particles with diameters typically greater than 0.1 microns and often in the range of 0.5 to 5 microns.

However, both the cathode and anode layers may be coated in a separator/electrode assembly and those assemblies combined to form a dry separator/electrode cell. In this case, the separator layer may be present on all of the electrode layers to give a "double separator" layer between the cathode and anode layers or, alternatively, may be present on only one electrode side of the separator/electrode assembly, as described in the present invention.

For the current collector layer, alternatively, a conductive non-metallic layer, such as a carbon pigment coating, as known in the art of lithium batteries, may be coated before and/or after the deposition of the metal current collector layer in order to achieve improved current collection and battery efficiency, as well as providing some additional mechanical strength and flexibility. The metal current collector layer may be much thinner than the typically 10 to 12 micron thick metal substrates used in lithium batteries. For example, the metal current collector may have a thickness of less than 3 microns, and may be as thin as about 1 micron, such as in the range of 0.5 to 1.5 microns thick. This allows a higher proportion of electroactive material into the lithium battery, thereby enhancing the energy and power densities of the lithium battery. The metal current collector layer may be deposited by any of the metal deposition methods known in the art, such as by vacuum deposition in the case of aluminum layers.

Figure 8:
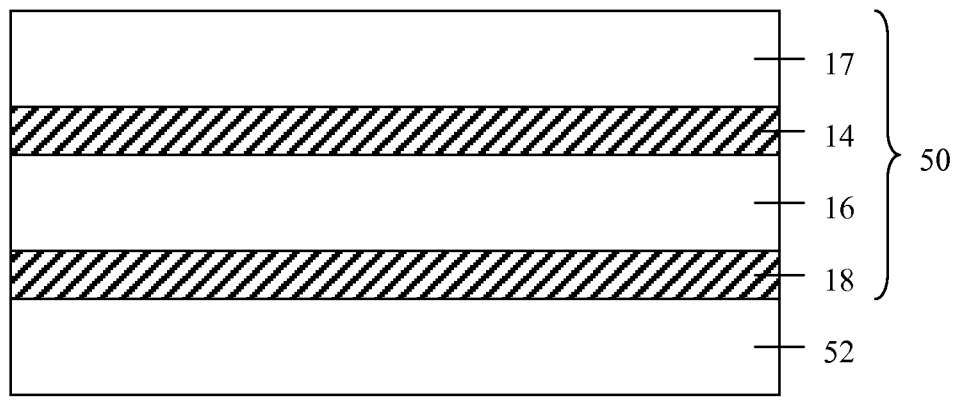
FIG. 8 shows a cross-section view of a separator/cathode assembly coated on a substrate prior to a step of delamination to remove the substrate.
Figure 9:
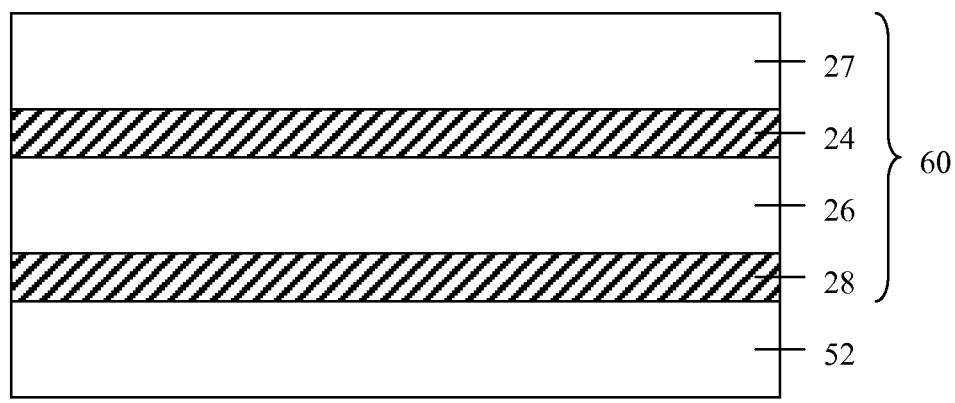
FIG. 9 shows a cross-section view of a separator/anode assembly coated on a substrate prior to a step of delamination to remove the substrate.

FIG. 8 shows an example of a cross-section view (not to scale) of a separator/cathode assembly 50 coated directly on a substrate 52 after steps (a)-(d). Separator/cathode assembly 50 has a separator layer 18, a first cathode layer 16, a second cathode layer 17, and a cathode current collector layer 14. FIG. 9 shows an example of a cross-section view (not to scale) of a separator/anode assembly 60 coated directly on a substrate 52 after steps (a) and (e)-(g). Separator/anode assembly 50 has a separator layer 28, a first anode layer 26, a second anode layer 27, and an anode current collector layer 24.

Delaminating the substrate 52 in FIG. 8 from the adjacent separator layer 18 results in the separator/cathode assembly, as, for example, shown in FIG. 2. Delaminating the substrate 52 in FIG. 9 from the adjacent separator layer 28 results in the separator/anode assembly, as, for example, shown in FIG. 3.

The separator/cathode assembly and the separator/anode assembly may be slit to narrower widths and sheeted to desired shapes prior to interleaving them to make the dry battery cell with portions of the separator/cathode assembly and of the separator/anode assembly which are free of overlying and underlying layers with electrodes of the opposite polarity and thus are in a configuration for the current collection of multiple electrode and current collector layers of the same polarity. Also, the separator/cathode assembly and the separator/anode assembly may be slit to narrower widths and interleaved by offsetting them from each other similarly to what is done in making cylindrical lithium batteries by winding together plastic separator, cathode, plastic separator, and anode strips of different widths and edge offsets from each other. Any of the methods of edge connection known in the art of lithium batteries, such as, for example, metal tabbing and vapor deposited metal edges, may also be used for the lithium batteries of this invention. Also, electrically insulating materials may be deposited on the edges of the separator/cathode assembly or the separator/anode assembly to provide additional protection against any short circuits with the electrode and current collector layers of opposite polarity.

In one embodiment, after step (i), a portion of the separator/cathode assembly is not in contact with the separator/anode assembly and a portion of the separator/anode assembly is not in contact with the separator/cathode assembly, and wherein a first device with electrically conductive pins electrically connects two or more of the portions of the separator/cathode assembly and a second device with electrically conductive pins electrically connects two or more of the portions of the separator/anode assembly. An example of the resulting dry electrode/separator cell is shown in FIG. 7. In one embodiment, there are further steps of (1) enclosing said dry separator/electrode cell in a casing and (2) filling with electrolyte and sealing. Suitable casing materials and methods and electrolyte filling and sealing methods include those that are known in the art of lithium batteries. The casing helps to prevent any leakage of electrolyte and to provide additional mechanical protection. The electrolyte filling and sealing convert the dry battery cell into a "wet" lithium battery ready for charge-discharge cycling and customer use.

The casing for the lithium batteries and methods of making lithium batteries of this invention may be designed to be useful in the positioning and the alignment of the separator/cathode assembly and the separator/anode assembly in the interleaving step and also to be useful in the positioning and placement of the device with the electrically conductive pins. For example, in one approach to making flat batteries, the bottom of the casing and four corner posts attached to the bottom could position and hold in place the interleaved separator/cathode assemblies and separator/anode assemblies at right angles to each other with a slight overlap of each assembly for about 4 to 10 mm on each edge positioned between two of the four corner posts. Referring to FIG. 7, these four corner posts could be positioned at the four corners of the top down view to position and hold in place the sheets during the interleaving step and prior to the edge connection with the device with electrically conductive pins. To complete the battery fabrication, for example, the top of the casing could be then attached to the four corner posts with openings on the edges of the top casing aligned with openings or holes on the edges of the bottom casing and positioned to accept the particular device with electrically conductive pins. After doing the electrical connections on the edges, the remainder of the four sides of the casing could then be attached to the casing. These sides of the casing for flat batteries are likely to be very short in height, such as less than 10 mm, compared to the width of each side, such as about 100 to 200 mm. The casing may have a fill hole for the electrolyte as an opening on one of the sides, preferably on the top of the casing. After the filling with the electrolyte, this fill opening is sealed to provide the "wet" battery that is ready for formation cycling and testing before customer use.

The casing also provides the pathway for the electrical connections of the battery to the external circuits. This may be done in a variety of ways known in the art of lithium batteries and their casings. For example, the casing may be made of a metal, such as aluminum, as one electrode connection and a metal pin that is electrically insulated from the metal casing may be accessible for external circuit connections on the outside of the casing as the other electrode connection. Also, for example, the casing may be plastic and the devices with electrically conductive pins may be accessible on the outside of the casing for each of the electrodes. Many other variations of edge connection are available. For example, the edge connection for each separator/electrode assembly for flat batteries could be done on only one edge, instead of on both edges for each separator/electrode assembly. This approach could further simplify the fabrication of the battery, while still providing effective edge connection. The length and width dimensions of the electrodes may be optimized to match with the preferred edge connection and external electrical connection. For example, for the edge and external electrical connections on only one side of each of the separator/electrode assemblies, the length of that side might be much larger than the width distance to the side with no electrical connection.

In one embodiment of the methods of preparing lithium batteries of this invention, at least one of the one or more cathode current collector layers of step (c) comprises a metal layer and the thickness of the metal layer is less than 3 microns. In one embodiment, at least one of the one or more anode current collector layers of step (f) comprises a metal layer and the thickness of the metal layer is less than 3 microns. In one embodiment, the separator layer has a pore diameter of less than 0.2 microns, and is preferably is less than 0.1 microns. In one embodiment, the separator layer comprises pores having an average pore diameter of less than 0.2 microns, and preferably less than 0.1 microns. In one embodiment, the separator layer has a thickness of less than 9 microns, and preferably less than 6 microns. Other electric current producing cells, such as capacitors and batteries using chemistries that do not involve lithium, may also be fabricated by methods and product designs similar to those described hereinabove.

What is claimed is:

1. A lithium battery comprising:
 a separator/cathode assembly, wherein said separator/cathode assembly comprises a cathode current collector layer interposed between a first cathode layer and a second cathode layer and a first porous separator layer on a side of said first cathode layer opposite to the side of said cathode current collector layer, and wherein said first cathode layer is coated directly on said first porous separator layer;
 a separator/anode assembly, wherein said separator/anode assembly comprises an anode current collector layer interposed between a first anode layer and a second anode layer and a second porous separator layer on a side of said first anode layer opposite to the side of said anode current collector layer, and wherein said first anode layer is coated directly on said second porous separator layer and said second porous separator layer comprises inorganic oxide particles and comprises no pores larger than 0.2 microns in diameter; and
 an electrolyte, wherein said battery comprises alternating layers of said separator/cathode assembly and said separator/anode assembly, and the distance between the first cathode layer and the second anode layer is less than 9 microns.

2. The battery of claim 1, wherein said first cathode layer comprises electrode particles selected from the group consisting of electroactive particles and electrically conductive particles, and wherein said electrode particles are not present in said first separator layer.

3. The battery of claim 1, wherein said first separator layer comprises separator particles, and wherein said separator particles are not present in said first cathode layer.

4. The separator/anode assembly of claim 3, wherein said separator particles are selected from the group consisting of, inorganic nitride particles, inorganic carbonate particles, inorganic sulfate particles, and polymer particles.

5. The battery of claim 1, wherein a first portion of said separator/cathode assembly and a second portion of said separator/cathode assembly are in electrical contact with each other and are not in contact with said separator/anode assembly.

6. The battery of claim 1, wherein a first portion of said separator/anode assembly and a second portion of said separator/anode assembly are in electrical contact with each other and are not in contact with said separator/cathode assembly.

7. The battery of claim 1, wherein the thickness of said separator layer of said separator/cathode assembly is less than 9 microns.

8. The battery of claim 1, wherein the thickness of said second separator layer is less than 9 microns.

9. The battery of claim 1, wherein said first separator layer comprises a xerogel membrane.

10. The battery of claim 1, wherein said first separator layer comprises aluminum boehmite.

11. The battery of claim 1, wherein said first separator layer is a heat resistant separator layer with dimensional stability at 200° C.

12. The battery of claim 1, wherein said second separator layer comprises a xerogel membrane.

13. The battery of claim 1, wherein said second separator layer comprises aluminum boehmite.

14. The battery of claim 1, wherein said second separator layer is a heat resistant separator layer with dimensional stability at 200° C.

15. The battery of claim 1, wherein said cathode current collector layer of said separator/cathode assembly comprises an electrically conductive material selected from the group consisting of electrically conductive metals, electrically conductive carbons, and electrically conductive polymers.

16. The battery of claim 1, wherein said cathode current collector layer of said separator/cathode assembly comprises two or more layers coated directly on said first cathode layer, and wherein at least one of said two or more layers comprises an electrically conductive material comprising carbon.

17. The battery of claim 1, wherein said anode current collector layer of said separator/anode assembly comprises an electrically conductive material selected from the group consisting of electrically conductive metals, electrically conductive carbons, and electrically conductive polymers.

18. The battery of claim 1, wherein said anode current collector layer of said separator/anode assembly comprises two or more layers coated directly on said first anode layer, and wherein at least one of said two or more layers comprises an electrically conductive material comprising carbon.

19. The battery of claim 1, wherein said first anode layer comprises electrode particles selected from the group consisting of electroactive particles and electrically conductive particles, and wherein said electrode particles are not present in said second separator layer.

20. The battery of claim 1, wherein said second separator layer comprises separator particles, and wherein said separator particles are not present in said first anode layer.

21. The battery of claim 20, wherein said separator particles are selected from the group consisting of inorganic nitride particles, inorganic carbonate particles, inorganic sulfate particles, and polymer particles.

22. A lithium battery comprising:
a separator/cathode assembly, wherein said separator/cathode assembly comprises a cathode current collector layer interposed between a first cathode layer and a second cathode layer and a first porous separator layer on a side of said first cathode layer opposite to the side of said cathode current collector layer, and wherein said first cathode layer is coated directly on said first porous separator layer;
a separator/anode assembly, wherein said separator/anode assembly comprises an anode layer and a second porous separator layer on a side of said anode layer, and wherein said anode layer is coated directly on said second porous separator layer and said second porous separator layer comprises inorganic oxide particles and comprises no pores larger than 0.2 microns in diameter; and
an electrolyte; wherein said battery comprises alternating layers of said separator/cathode assembly and said separator/anode assembly, and the distance between the second cathode layer and the anode layer is less than 9 microns.

23. The battery of claim 22, wherein said anode layer comprises lithium metal.

24. The battery of claim 22, wherein said first cathode layer and second cathode layer comprise sulfur or a polysulfide of the formula, $S_x^{2-}$, wherein x is an integer from 2 to 8.

* * * * *

UNITED STATES PATENT AND TRADEMARK OFFICE
CERTIFICATE OF CORRECTION

| | | |
|---|---|---|
| PATENT NO. | : 9,065,120 B2 | Page 1 of 1 |
| APPLICATION NO. | : 13/302795 | |
| DATED | : June 23, 2015 | |
| INVENTOR(S) | : Steven A. Carlson et al. | |

It is certified that error appears in the above-identified patent and that said Letters Patent is hereby corrected as shown below:

In the Claims

In claim 4, please delete "The separator/anode assembly of claim 3" and insert -- The battery of claim 3 --.

Signed and Sealed this
First Day of December, 2015

Michelle K. Lee
*Director of the United States Patent and Trademark Office*